2,767,180

TRIAZINE DIURETIC AND PROCESS FOR PREPARING THE SAME

Stanley O. Winthrop, Montreal, Quebec, and Gordon A. Grant, Mount Royal, Quebec, Canada, assignors to American Home Products Corporation, New York, N. Y., a corporation of Delaware No Drawing. Application May 17, 1955,
Serial No. 509,098

7 Claims. (Cl. 260—249.6)

This invention relates to a new chemical compound possessing diuretic properties and to the process by which this compound may be prepared. The new compound is valuable for use in human and veterinary medicine.

We have found that 2,4-diamino-6-pyridinium triazine chloride, a compound having the following formula:

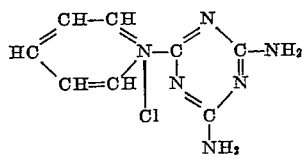

may be readily prepared by reacting pyridine and 2,4-diamino-6-chlorotriazine in an inert solvent. Inert solvents such as dialkyl formamides and dialkyl acetamides, especially di-lower alkyl formamides and acetamides, in which both the 2,4-diamino-6-chlorotriazine and pyridine are sufficiently soluble to permit the reaction to proceed with rapidity, are especially suitable. Examples of such inert solvents are dimethylformamide, diethylformamide, dimethyl acetamide, etc. The resulting quaternary salt of pyridine possesses definite diuretic activity and it has potential value in medicine.

In carrying out the reaction between pyridine and 2,4-diamino-6-chlorotriazine, it is only necessary to bring the two reactants together in the inert solvent as specified, preferably one in which both reactants are soluble or at least somewhat soluble. When carried out at an elevated temperature the reaction is practically immediate, the triazine quaternary salt of pyridine being precipitated in high yields.

The following example is illustrative of our invention:

Example 2 grams of 2,4-diamino-6-chlorotriazine were dissolved in 150 milliliters of boiling dimethylformamide, and 2.4 grams of pyridine were added to the solution. After about 1 minute a solid started to precipitate. It was filtered off, washed with ether, and dried, there being thus obtained 2.7 grams of white crystals. Two recrystallizations of the crystalline product from alcohol yielded 1.8 grams of purified product. The white crystalline material was soluble in water and, when heated, charred and sublimed around 300° C. Calc. for $C_8H_9N_6Cl$: C, 42.77; H, 4.04; N, 37.41; Cl, 15.75. Found: C, 44.02; 44.20; H, 4.25; 4.00; N, 37.54; 37.41; Cl, 15.26; 14.90.

We claim:

1. 2,4-diamino-6-pyridinium triazine chloride.
2. The process of preparing 2,4-diamino-6-pyridinium triazine chloride which comprises bringing 2,4-diamino-6-chlorotriazine and pyridine together in the presence of an inert solvent.
3. The process of preparing 2,4-diamino-6-pyridinium triazine chloride which comprises bringing 2,4-diamino-6-chlorotriazine and pyridine together in the presence of an inert solvent in which said 2,4-diamino-6-chlorotriazine and pyridine are soluble.
4. The process of preparing 2,4-diamino-6-pyridinium triazine chloride which comprises bringing 2,4-diamino-6-chlorotriazine and pyridine together in the presence of an inert solvent selected from the group which consists of dialkyl formamides and dialkyl acetamides.
5. The process of preparing 2,4-diamino-6-pyridinium triazine chloride which comprises bringing 2,4-diamino-6-chlorotriazine and pyridine together in the presence of dimethylformamide, and recovering the precipitated product.
6. The process of preparing 2,4-diamino-6-pyridinium triazine chloride which comprises bringing 2,4-diamino-6-chlorotriazine and pyridine together in the presence of diethylformamide, and recovering the precipitated product.
7. The process of preparing 2,4-diamino-6-pyridinium triazine chloride which comprises bringing 2,4-diamino-6-chlorotriazine and pyridine together in the presence of dimethylacetamide, and recovering the precipitated product.

No references cited.